Figure 1:
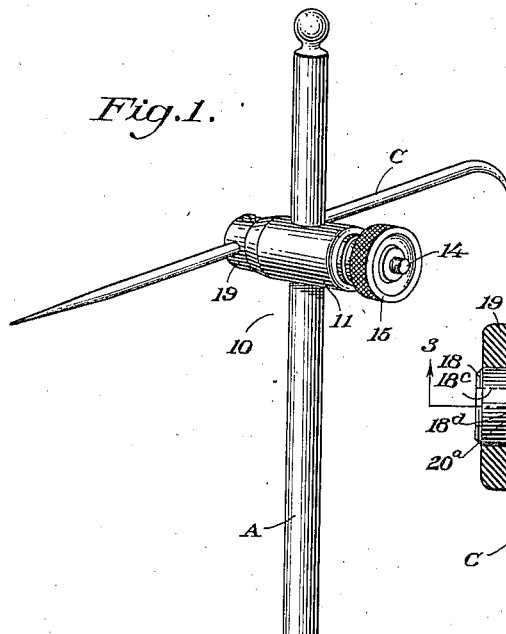

Feb. 9, 1943.    W. F. BILZ    2,310,276
SURFACE GAUGE CLAMP
Filed Oct. 18, 1941

William F. Bilz
INVENTORS
BY Victor J. Evans & Co.
ATTORNEYS

Patented Feb. 9, 1943

2,310,276

UNITED STATES PATENT OFFICE 2,310,276

SURFACE GAUGE CLAMP

William F. Bilz, Coulters, Pa.

Application October 18, 1941, Serial No. 415,621

5 Claims. (Cl. 33—169)

This invention relates to improvements in devices useful in conjunction with machine tools for measuring variations in surfaces and especially is concerned with a novel clamp for holding an index arm upon a spindle.

It is a primary object of this invention to provide a novel clamp useful for attaching an index arm upon a spindle or standard whereby the index arm can be readily adjusted and rigidly clamped into position through manipulation of a single control knob.

An advantage of the novel clamp according to this invention over existing clamps used in attaching indexes to standards is that it permits the application of a degree of tension or gripping to both index and standard which facilitates preliminary exact adjustment which may be made final merely by tightening a conveniently located knob whereby both index arm and spindle simultaneously are gripped rigidly to hold one with respect to the other.

Noteworthy among the features of the novel clamp according to the present invention are its simplicity and ruggedness of construction, the former suiting the device to the requirements of manufacture under conditions of mass production and the latter assuring long useful life.

Other objects, advantage and features of the new and improved clamp according to the present invention will be apparent to those skilled in this art during the course of the following description.

Regarded in certain of its broader aspects the novel clamp according to the present invention comprises a hollow essentially cylindrical casing within which are freely slidingly mounted a plurality of concentric sleeves, the sleeves and casing having openings formed therein to receive parts of the index arm and the spindle with which the device is to be used, and means for drawing the sleeves with respect to each other and the casing whereby the openings previously registering are slightly moved from register, gripping and holding both the spindle and the index arm.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Figure 2:
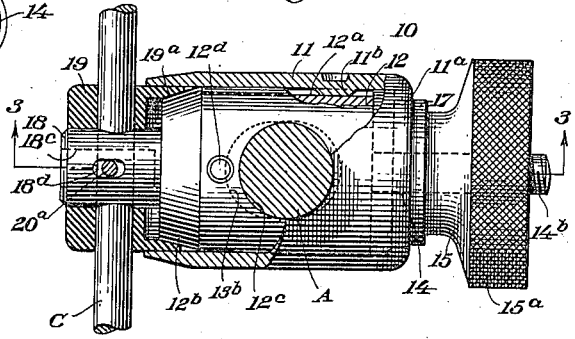
Figure 3:
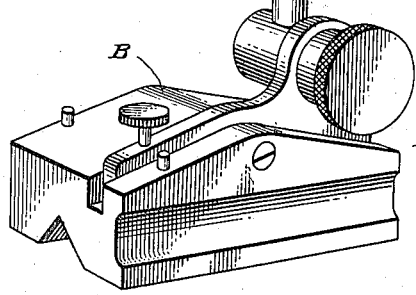
Figure 3:
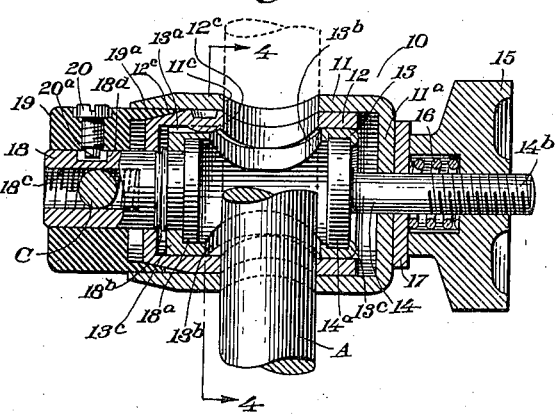
Figure 4:
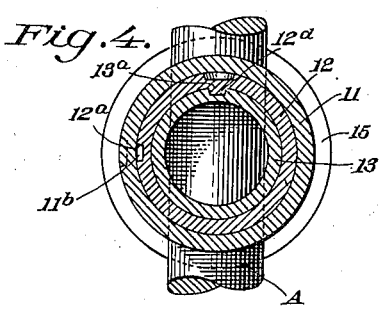

Referring now to the drawing,

Figure 1 is substantially a perspective view of the presently preferred embodiment of this invention showing the same positioned as in use upon a spindle and casing index arm, Fig. 2 is a substantially top plan view of the clamp illustrated in Fig. 1 with parts broken away to expose interior structure, Fig. 3 is essentially a vertical sectional view of Fig. 2 taken along a plane designated by the line 3—3, and Fig. 4 is essentially a vertical sectional view of Fig. 3 taken along a plane indicated by the line 4—4.

Referring now to Fig. 1 wherein the novel clamp according to this invention generally designated by the reference character 10 is shown mounted upon a spindle A supported upon a base B, it will be seen that the clamp provides means for holding an essentially horizontally extending index arm C positionable against a work surface to be measured in a manner familiar to those skilled in arts related to machine tools.

In Figs. 2 to 4 inclusive the structural details of the clamp according to this invention best are illustrated and it is to these figures accordingly that reference now is made. The clamp 10 comprises a hollow cup-like essentially cylindrical casing 11 having a closed end portion 11a. Within the casing is freely slidingly mounted a first sleeve 12 open at both ends and prevented from rotation with respect to the casing by means including a key 11b struck in from the casing side engaging with a keyway 12a formed on the outer surface of the sleeve 12. Registerable diametrically positioned transversely extending openings 11c and 12c are formed in the casing 11 and first sleeve 12 respectively and serve to receive the spindle A substantially as shown. It will be obvious to those skilled in this art that the casing and sleeve can be freely slidingly moved upon the spindle except when an attempt is made to move the first sleeve 12 with respect to the casing 11 causing the openings 11c and 12c to move from registry, in which event the clamp will grasp the spindle and be rigidly held thereon.

A second sleeve 13 freely slidably mounted within the first sleeve 12 is held from rotation with respect to the first sleeve by means including a key 12d formed integral with the sleeve 12 engaging with a keyway 13a formed on the outer surface of the sleeve 13. Diametrically positioned transversely extending semi-oval openings 13b are formed in the sleeve 13 through which the spindle A can be passed when the same is received in the openings 11c and 12c formed in the casing and first sleeve as hereinabove described. It will be apparent that the oval shape of the opening 13b permits appreciable though limiting sliding movement of the second sleeve with respect to the first sleeve when the clamp is mounted upon the spindle. A rod 14 freely slidably mounted in an opening formed in the closed end of the casing 11 terminates at its inner end in a head 14a and at its opposite end in a threaded portion 14b substantially as shown. The head 14a is received in an internally recessed marginal portion of the sleeve 13 and is held in position therein by an overturned lip 13c whereby the head and sleeve constitute a rigidly integrated assembly slidable with respect to both the first sleeve and the casing. An adjustment knob 15 internally threaded to be received upon the threaded end portion 14b of the rod 14 is provided on its outer surface with a knurling 15a to facilitate adjustment as will be hereinafter described. The portion of the knob 15 nearest the casing 11 bears against a washer 17 positioned upon the rod 14 whereby the sleeve 13 can be drawn toward the closed end of the casing as will be apparent from the drawing. A spring 16 sleeved upon the rod 14 and received within a cavity of the knob 15 serves normally to urge the sleeve 13 in the direction in which it is drawn by appropriate rotation of the knob 15.

A member 18 having a round head 18a adapted to be received against an integrally formed shoulder 13d on the end of the sleeve 13 remote with respect to the closed end 11a of the casing 11 is freely rotatably held with respect to the sleeve 13 by means of an upturned annular formation 18b which abuts against the outer edge of the shoulder 13d above mentioned. A tapped opening 18c extends axially inwardly from the outer end of the member 18 substantially as shown. An annulus 19 freely slidably mounted upon the member 18 held from rotation with respect thereto by a screw 20 mounted in the annulus 19 and having an end portion 20a received in a keyway 18d formed in the member 18 includes a portion 19a extending toward and engaging with a tapered edge portion 12b of the sleeve 12. Registering transversely extending diametrically positioned openings are formed in the member 18 and the annulus 19 freely slidably to receive the index arm C. It will be obvious to those skilled in this art that when the sleeve 13 is drawn toward the closed end 11a of the casing 11 the member 18 will be carried therewith and accordingly the openings in the member 18 and the annulus 19 in which the index arm C is received will be moved slightly from registry, thereby causing the arm to be gripped firmly by the member and the annulus. The motion of the member 18 is transferred through the arm C to the annulus which in turn bears against the end portion of the sleeve 12, thereby causing said sleeve to move with respect to the casing 11, thus slightly moving the openings 11c and 12c from registry and causing the spindle A to be gripped. Thus it will be seen the movement of the sleeve 13 by rotation of the knob 15 whereby the threaded rod 14 is drawn outwardly from the casing causes simultaneous gripping of both the index arm and the spindle.

The spring 16 normally tensions the sleeve 13 in a manner such that appropriate adjustment of the index C may be made before final tightening of the knob 15 with resultant rigid gripping of the arm and spindle.

It is to be understood that this invention is capable of extended application and is not confined to the precise illustrated forms nor described construction and, therefore, such changes and modifications may be made therein as do not affect the spirit of the invention and exceed the scope of the appended claims.

Having thus described the present invention, what it is desired to secure by Letters Patent is:

1. A clamp for holding an index arm upon a spindle comprising a casing, sleeves slidably mounted within said casing, said sleeves and parts of said casing having normally registering openings formed therein for receiving said spindle and said arm, and means for slidingly moving said sleeves whereby said openings are moved slightly out of registry causing gripping of the spindle and index arm.

2. A clamp for holding an index arm upon a spindle comprising a substantially cylindrical hollow casing, concentric sleeves freely slidably mounted within said casing, means connecting said sleeves and said casing whereby relative rotative motion is precluded but sliding motion is uninhibited, parts of said casing and said sleeves having openings formed therein for receiving the index arm and the spindle, and means for slidingly moving said sleeves with respect to said casing whereby the normally registering openings are moved slightly out of registry thereby causing the spindle and the arm to be gripped and rigidly held in the selected relationship.

3. A clamp for holding an index arm upon a spindle comprising a substantially cylindrical hollow casing, concentric sleeves freely slidably mounted within said casing, means connecting said sleeves and said casing whereby relative rotative motion is precluded but sliding motion is uninhibited, parts of said casing and said sleeves having openings formed therein for receiving the index arm and the spindle, and means for slidingly moving said sleeves with respect to said casing whereby the normally registering openings are moved slightly out of registry thereby causing the spindle and the arm to be gripped and rigidly held in the selected relationship, said means comprising a screw-like member connected to one of the sleeves projecting through an opening formed in the casing and a threaded knob mounted upon said member whereby rotation of the knob can upon occasion cause movement of the member with concomitant movement of the sleeves.

4. A clamp for holding an index arm upon a spindle comprising a cylindrical casing closed at one end, fully open at the other; a first sleeve axially freely slidably mounted within said casing in a manner precluding rotation of the sleeve with respect to the casing; said casing and said sleeve having registerable diametrically opposed transversely extending openings formed therein to receive the spindle and, when the first sleeve is moved toward the closed end of the casing, to hold the casing in a selected position on the spindle; a second sleeve freely slidably mounted within said first sleeve in a manner precluding relative rotative motion; means for drawing the second sleeve toward the closed end of the casing; an axially extending member, freely rotatively mounted on said second sleeve nearest to and projecting outwardly through the open end of the casing; an annulus freely slidably mounted on said member in a manner precluding relative rotation of the annulus and the member, said member and said annulus having transversely diametrically extending registerable openings formed therein for receiving and, when the annulus is moved axially relative to the member, holding the index arm, a portion of the annulus extending toward and engaging the near end of the said first sleeve whereby drawing of the second sleeve toward the closed end of the casing when the index arm is positioned in the openings formed in the member and the annulus causes the index arm to be gripped and the first sleeve to be moved axially thereby holding the casing upon the spindle.

5. A clamp for holding an index arm upon a spindle comprising a cylindrical casing closed at one end, fully open at the other; a first sleeve axially freely slidably mounted within said casing, a key on the inner surface of said casing engaging a keyway formed in said first sleeve whereby relative rotation of said sleeve and said casing is precluded; said casing and said sleeve having registerable diametrically positioned transversely extending openings formed therein to receive the spindle and, when the first sleeve is moved toward the closed end of the casing, to hold the casing in a selected position on the spindle; a second sleeve, freely slidably mounted within said first sleeve and keyed thereto in a manner precluding relative rotative motion; means for drawing the second sleeve toward the closed end of the casing comprising a threaded shaft connected to the sleeve and projecting outwardly through an opening formed in the closed end of the casing, and a knurled nut on said projecting portion of the threaded shaft; means comprising a spring sleeved on said shaft for normally urging said second sleeve toward said closed end of the casing; an axially extending member, freely rotatably mounted on the second sleeve nearest to and projecting outwardly through the open end of the casing; an annulus freely slidably mounted on said member, a key mounted on said annulus engaging with a keyway formed in said member for preventing relative rotative motion of the annulus and the member, said member and said annulus having transversely diametrically extending registerable openings formed therein for receiving and, when the annulus is moved axially relative to the member, holding the index arm, a portion of the annulus extending toward and engaging with the near end of said first sleeve whereby drawing of the second sleeve toward the closed end of the casing when the index arm is positioned in the openings formed in the member and the annulus causes the index arm to be gripped and the first sleeve to be moved axially thereby holding the casing upon the spindle.

WILLIAM F. BILZ.